(12) United States Patent
Mohiti Asli et al.

(10) Patent No.: US 12,172,559 B2
(45) Date of Patent: Dec. 24, 2024

(54) BAGGAGE BAR ENERGY ABSORBER

(71) Applicant: Safran Seats USA LLC, Gainesville, TX (US)

(72) Inventors: Ali Mohiti Asli, Frisco, TX (US); Amen Omoragbon, Westminster, CA (US); Reza Mansouri, Santa Fe Springs, CA (US)

(73) Assignee: Safran Seats USA LLC, Gainesville, TX (US)

( * ) Notice: Subject to any disclaimer, the term of this patent is extended or adjusted under 35 U.S.C. 154(b) by 40 days.

(21) Appl. No.: 17/896,533

(22) Filed: Aug. 26, 2022

(65) Prior Publication Data
US 2024/0067064 A1 Feb. 29, 2024

(51) Int. Cl.
*B64D 11/06* (2006.01)
*B60N 2/427* (2006.01)
*B60R 7/04* (2006.01)
*F16F 15/04* (2006.01)

(52) U.S. Cl.
CPC .............. *B60N 2/427* (2013.01); *B60R 7/043* (2013.01); *B64D 11/0619* (2014.12); *B64D 11/0636* (2014.12); *F16F 15/04* (2013.01); *F16F 2224/025* (2013.01); *F16F 2230/00* (2013.01)

(58) Field of Classification Search
CPC B60N 2/427; B64D 11/0619; B64D 11/0636; B60R 7/043; F16F 15/04; F16F 2224/025; F16F 2230/00
See application file for complete search history.

(56) References Cited

U.S. PATENT DOCUMENTS

| | | | | |
|---|---|---|---|---|
| 4,718,719 A | * | 1/1988 | Brennan | B64D 11/0696 296/68.1 |
| 4,861,103 A | * | 8/1989 | Vallee | B64D 25/04 297/445.1 |
| 7,399,037 B2 | * | 7/2008 | Schumacher | B64D 11/0696 297/232 |
| 9,950,796 B2 | | 4/2018 | Guttropf et al. | |
| 10,322,808 B2 | * | 6/2019 | Alamgir | B60N 2/005 |
| 11,066,171 B2 | * | 7/2021 | Papke | B64D 11/0023 |
| 2002/0175554 A1 | | 11/2002 | Cheng | |
| 2007/0018494 A1 | | 1/2007 | Gutosky, Jr. | |
| 2007/0152480 A1 | * | 7/2007 | Muin | B64D 11/003 297/188.08 |
| 2012/0205329 A1 | * | 8/2012 | Fujita | B64D 11/06 211/27 |

FOREIGN PATENT DOCUMENTS

GB 2582654 A 9/2020

OTHER PUBLICATIONS

European Application No. 23192453.1, Extended European Search Report mailed on Jan. 29, 2024, 8 pages.

* cited by examiner

*Primary Examiner* — Philip F Gabler
(74) *Attorney, Agent, or Firm* — Kilpatrick Townsend & Stockton LLP

(57) ABSTRACT

A baggage bar assembly may be provided for a passenger seat such as but not limited to an aircraft passenger seat. The baggage bar assembly includes a baggage bar and a support for supporting the baggage bar relative to the passenger seat. The support of the baggage bar assembly also allows for movement of the baggage bar relative to the passenger seat.

11 Claims, 5 Drawing Sheets

BAGGAGE BAR ENERGY ABSORBER

FIELD OF THE INVENTION

The field of the invention relates to passenger seats for passenger vehicles such as aircraft, and more particularly to baggage bars for passenger seats.

BACKGROUND

Passenger seats, such as those provided on aircraft, trains, vehicles, and the like, sometimes include stowage space under the seats for baggage, personal items, and/or other items as desired. To prevent baggage from sliding forward out of the stowage space and into the leg space of a passenger, passenger seats often include a baggage bar. The baggage bar typically extends in a lateral direction between opposing attachment points with the seat. The baggage bar is fixed relative to the passenger seat and prevents baggage or other items in the stowage space from sliding forward during take-off, landing, and/or other dynamic events. The baggage bar also prevents a passenger in an aft seat from encroaching into the leg space of the passenger of the passenger seat.

Existing baggage bars often include a doubler within the baggage bar at the location where the baggage bar connects to the passenger seat (e.g., the leg or other frame component). Typically, the doublers are provided to add strength and stiffness to the baggage bar to improve performance and reduce failure of the baggage bar dynamic event, but such doublers increase the weight of the baggage bar and the overall seat.

SUMMARY

The terms "invention," "the invention," "this invention" and "the present invention" used in this patent are intended to refer broadly to all the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present invention, a baggage bar assembly for a passenger seat includes a baggage bar and a support for supporting the baggage bar while allowing for movement of the baggage bar relative to the passenger seat.

In some embodiments, the support includes an energy absorber positionable within an aperture defined by the passenger seat. In various embodiments, the energy absorber defines a central aperture, and the baggage bar extends through the central aperture of the energy absorber. In some cases, a cross-section of the central aperture is different from a cross-section of the baggage bar.

In various embodiments, the support includes an elastomer shock absorber.

In certain embodiments, the support includes a spring mechanism positionable within an aperture defined by the passenger seat.

In some embodiments, the support is a bearing mechanism.

The support may be attachable to a frame component of the passenger seat or be positionable within an aperture defined by the frame component.

In various examples, the support allows for at least one of rotational movement or linear movement of the baggage bar. Optionally, the support allows for both rotational movement and linear movement of the baggage bar.

According to certain embodiments of the present invention, a passenger seat includes a frame component and the baggage bar assembly, and the support allows for movement of the baggage bar relative to the frame component.

In some embodiments, the frame component includes a seat leg of the passenger seat.

In certain cases, the frame component defines an aperture, the baggage bar extends through the aperture, and the support is provided within the aperture between at least a portion of the baggage bar and the frame component. A cross-section of the aperture may be different from a cross-section of the baggage bar. In certain embodiments, the support may include a bearing mechanism within the aperture.

According to certain embodiments of the present invention, a passenger seat includes a frame component and a baggage bar that is movable relative to the frame component.

In various embodiments, the passenger seat includes at least one of an elastomer shock absorber, a spring mechanism, or a bearing mechanism supporting the baggage bar relative to the frame component.

According to certain embodiments of the present invention, a baggage bar assembly for a passenger seat includes a baggage bar and a bearing mechanism configured to support the baggage bar on a portion of the passenger seat. The baggage bar may be movable via the bearing mechanism.

In some embodiments, the bearing mechanism includes ball bearings and defines a circular aperture for receiving the baggage bar.

In various embodiments, a passenger seat includes the baggage bar and a leg assembly for the passenger seat, and the leg assembly is the portion of the passenger seat supporting the bearing mechanism.

Various implementations described herein may include additional systems, methods, features, and advantages, which cannot necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The specification makes reference to the following appended figures, in which use of like reference numerals in different figures is intended to illustrate like or analogous components.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any order or arrangement among or between various steps or elements except when the order of individual steps or arrangement of elements is explicitly described.

The described embodiments of the invention provide baggage bar assemblies for passenger seats. While the baggage bar assemblies are discussed for use with aircraft seats, they are by no means so limited. Rather, embodiments of the baggage bar assemblies described herein may be used in passenger seats or other seats of any type or otherwise as desired.

Figure 1:
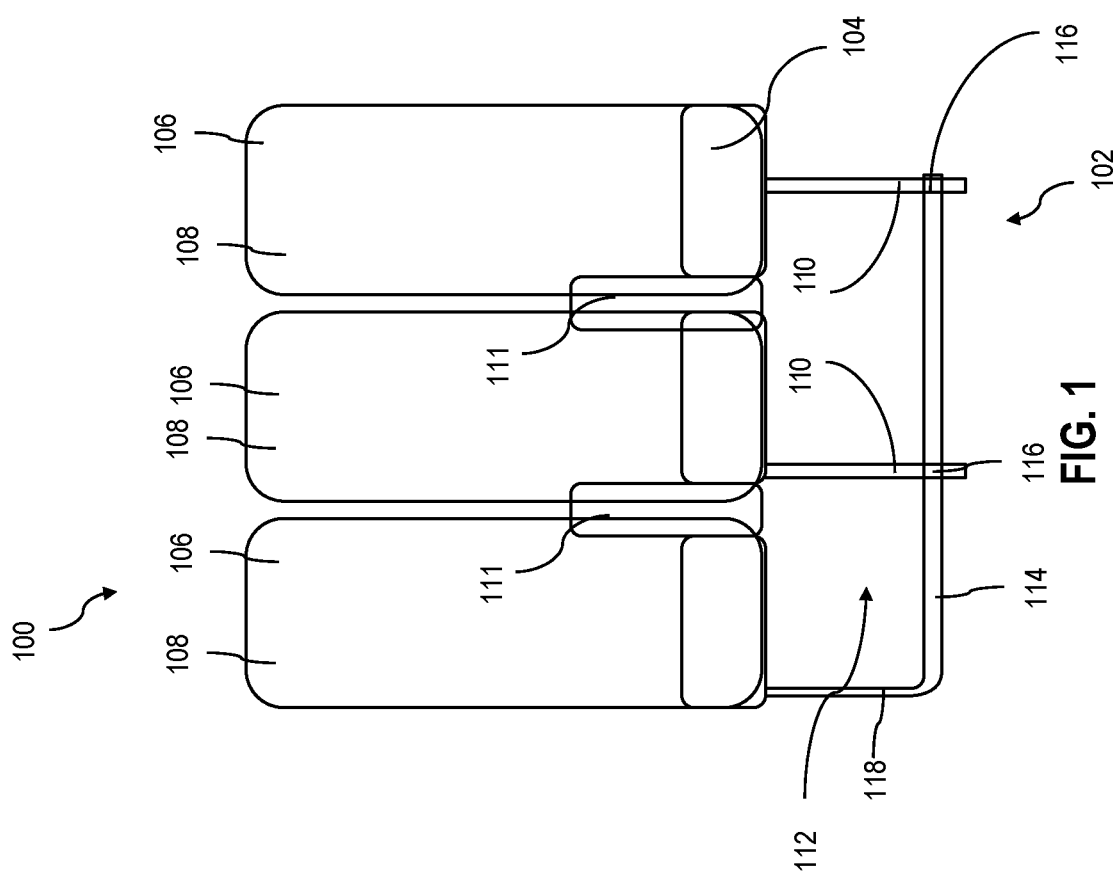
FIG. 1 is a front view of a passenger seat assembly with a baggage bar according to embodiments of the present invention.

FIG. 1 illustrates an example of a passenger seat assembly 100 with a baggage bar assembly 102 according to embodiments of the present invention. In general, the passenger seat assembly 100 includes a seat base 104 and at least one seat back 106 that is supported relative to the seat base 104. The number of seat backs 106 should not be considered limiting on the current disclosure. In various examples, the number of seat backs 106 corresponds with the number of passenger seats that the passenger seat assembly is capable of carrying, and each seat back 106 and the corresponding portion of the seat base 104 define a particular passenger seat 108. In the example of FIG. 1, the passenger seat assembly 100 can carry three passengers and accordingly has three seat backs 106 and three passenger seats 108. However, in other examples, the passenger seat assembly 100 may be capable of carrying any desired number of passengers, such as one passenger, two passengers, four passengers, or any other desired number of passengers. In these examples, the passenger seat assembly 100 can likewise have any desired number of corresponding seat backs 106 and passenger seats 108.

The seat base 104 of the passenger seat assembly 100 may include seat legs 108 and/or another frame component as desired. Each seat back 106 is connected to the seat base 104, and is often pivotable relative to the seat base 104 such that the seat back 106 can be positioned in various positions such as a taxi-takeoff-landing (TTL) position, a reclined position, etc. In some cases, other components of the passenger seat assembly 100, such as a tray table, in-flight entertainment equipment, cup holders, literature pockets, etc. may be supported on the seat back 106. In various embodiments, the passenger seat assembly 100 includes one or more armrests 111 that optionally may be pivotable relative to the seat base 104 and/or the seat back(s) 106. In some cases, at least one armrest 111 may be provided between adjacent seat backs 106, although it need not be in other examples. The number or location of the armrests 111 illustrated in FIG. 1 should not be considered limiting on the disclosure.

Each seat back 106 and the corresponding portion of the seat base 104 together at least partially define a living space for the passenger when used (i.e., the space that the passenger may occupy and use while sitting in a particular passenger seat). As illustrated in FIG. 1, a stowage space 112 may be defined under the seat base 104. During a flight and/or otherwise in use, various items such as baggage, personal items, feet of a passenger in an aft passenger seat, etc., may be within the stowage space 112.

The baggage bar assembly 102 of the passenger seat assembly 100 includes a baggage bar 114 and one or more supports 116. As illustrated in FIG. 1, the baggage bar 114 may extend below the seat base 104 and in a lateral (width) direction for preventing baggage or other items in the stowage space 112 from sliding forward during take-off, landing, and/or other dynamic events. Optionally, a side portion 118 of the baggage bar 114 may extend in a forward and aft direction to minimize movement of baggage or other items in the stowage space 112 in the lateral direction.

The support(s) 116 of the baggage bar assembly 102 support the baggage bar 114 relative to the passenger seat assembly 100. In certain embodiments, the support(s) 116 connect the baggage bar 114 to a portion of the passenger seat assembly 100 such as but not limited to the seat base 104, one or more legs 110, other frame components of the passenger seat assembly 100, and/or as otherwise desired. As such, while two supports 116 are illustrated in FIG. 1 supporting the baggage bar 114 on the legs 110, the number and location of the supports 116 on the passenger seat assembly 100 should not be considered limiting on the disclosure.

In various embodiments, the supports 116 of the baggage bar assembly 102 allow for movement of the baggage bar 114 relative to the passenger seat assembly 100. Optionally, the supports 116 allow for movement of the baggage bar 114 at least during a dynamic event such as but not limited to a 16G roll/pitch and/or step load event. In other embodiments, the supports 116 may allow for movement of the baggage bar 114 during various other events or as desired. The supports 116 may allow for various types or combinations of types of movement of the baggage bar 114 as desired, including linear movement of the baggage bar 114 and/or rotational movement of the baggage bar 114. The supports 116 may be various suitable devices, mechanisms, or features as desired allowing for movement of the baggage bar 114 relative to the passenger seat assembly 100, and non-limiting examples of supports 116 are discussed in greater detail below with reference to FIGS. 2-11.

The supports 116 of the baggage bar assembly 102 thus allow for movement of the baggage bar 114 where the baggage bar 114 connects with the portion of the passenger seat assembly 100 (e.g., the leg 110), and such movement absorbs energy and loads during dynamic events, thereby reducing stress on the baggage bar 114. The reduction in stress on the baggage bar 114 provided by the supports 116 in turn allows for baggage bars 114 with smaller wall thicknesses compared to traditional baggage bars to be used, and smaller wall thickness may provide weight savings to the overall passenger seat assembly 100 and cost savings to produce such baggage bars 114. The supports 116 described herein also allow for improved modularity of the baggage bar 114 relative to the leg 110 and/or other frame component to which the baggage bar 114 is attached, and the baggage bar 114 need not be keyed to the leg 110 and/or another frame component as traditionally required. Instead, the supports 116 described herein may allow for baggage bars 114 to have various cross-sectional shapes as desired that may be different from a shape of an aperture defined in the leg 110 and/or other frame component (in embodiments where the baggage bar 114 extends through the leg 110 or frame component). In other embodiments, the baggage bar 114 need not extend through the leg 110 or frame component, and the support 116 may support the baggage bar 114 offset from the leg 110 or frame component while still allowing for relative movement of the baggage bar 114. Various other benefits and advantages may be realized with the systems and methods provided herein, and the aforementioned advantages should not be considered limiting.

Figure 2:
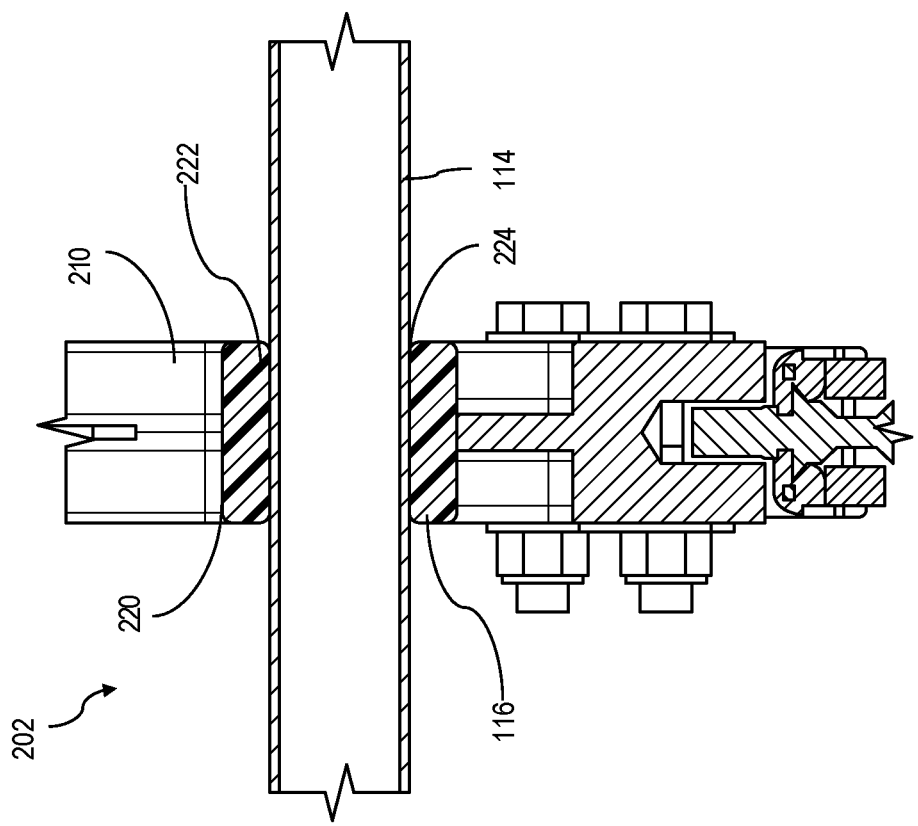
FIG. 2 is a sectional view of a portion of a leg of a passenger seat and a baggage bar assembly according to embodiments of the invention.
Figure 3:
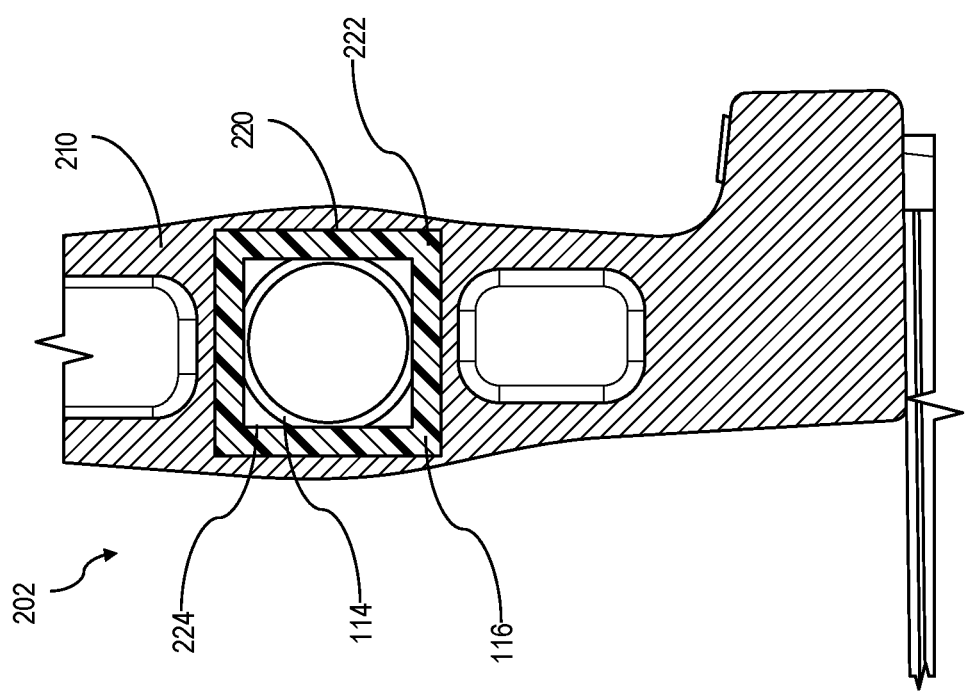
FIG. 3 is another sectional view of the leg and baggage bar assembly of FIG. 2.

FIGS. 2 and 3 illustrate an example of a baggage bar assembly 202 with a leg 210 of a passenger seat assembly. The baggage bar assembly 202 is substantially similar to the baggage bar assembly 102 and includes the baggage bar 114 and the support 116.

In various embodiments, the leg 110 defines an aperture 220, and the baggage bar 114 extends through the aperture 220. As best illustrated in FIG. 3, in the embodiment illustrated, the aperture 220 has a square profile while the baggage bar 114 has a circular profile. As mentioned, in other embodiments, the baggage bar 114 may have other shapes or profiles as desired and may or may not be complimentary to the shape or profile of the aperture 220.

In the embodiment illustrated, the support 116 is an energy absorber 222 constructed from an energy absorbing material such as but not limited to rubber (natural or synthetic), neoprene, silicone, foams, other elastomeric materials, combinations thereof, and/or other energy absorbing materials as desired. In the embodiment illustrated, an outer profile of the energy absorber 222 may conform to the shape of the aperture 220, which may facilitate positioning of the support 116 within the aperture 220. However, in other embodiments, the energy absorber 222 may have other shapes or profiles as desired, and it need not match the shape or profile of the aperture 220.

Figure 4:
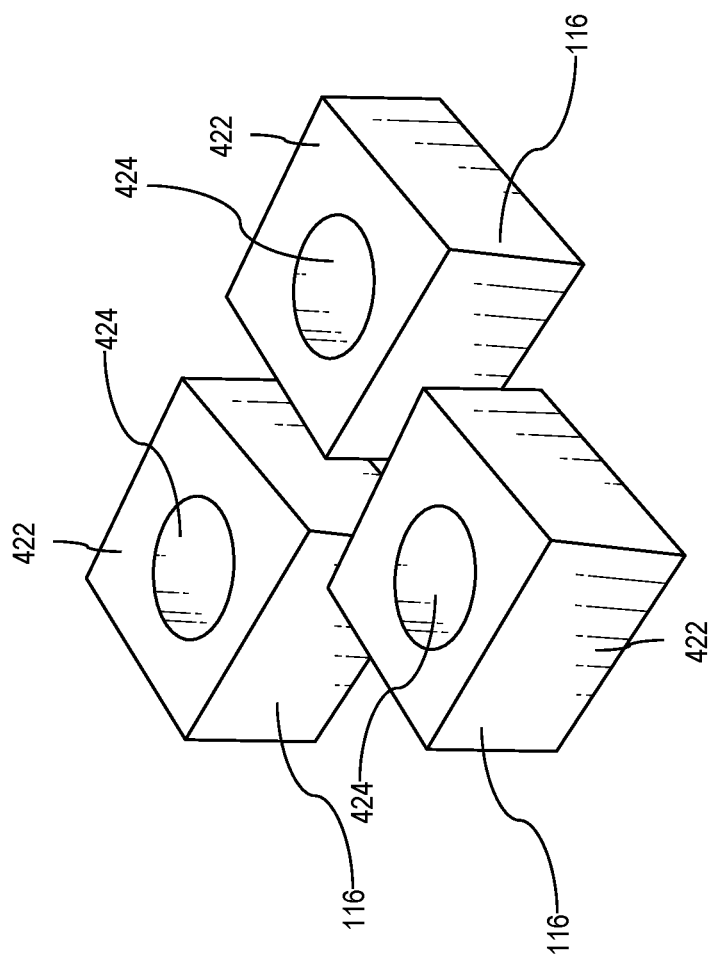
FIG. 4 illustrates supports for a baggage bar assembly according to embodiments of the present invention.

The energy absorber 222 itself defines an aperture 224 for receiving at least a portion of the baggage bar 114. The aperture 224 may be various shapes or profiles as desired, and the shape or profile of the aperture 224 need not match the shape or profile of the baggage bar 114. In the embodiment illustrated, the aperture 224 has a square profile (e.g., different from the circulate profile of the baggage bar 114). FIG. 4 illustrates another example of an energy absorber 422 as a support 116 for a baggage bar assembly and that is substantially similar to the energy absorber 222 except that the energy absorber 422 defines an aperture 424 with a circular profile.

When the baggage bar assembly 202 is assembled, the support 116 of the baggage bar assembly 202 is provided within the aperture 220 between the leg 210 and the baggage bar 114. Such positioning allows for movement of the baggage bar 114 relative to the leg 210 (e.g., via the energy absorbing material) while also connecting the baggage bar 114 to the leg 210. In the embodiment of FIGS. 2 and 3, the support 116 may allow for both linear movement and rotational movement of the baggage bar 114 relative to the leg 210. The energy absorber 222 as the support 116 absorbs energy or loads applied on the baggage bar 114. The energy absorber 222 as the support 116 decreases stiffness of the baggage bar assembly 202, which may allow for the baggage bar 114 to have a reduced thickness, thereby providing weight and cost savings.

Figure 6:
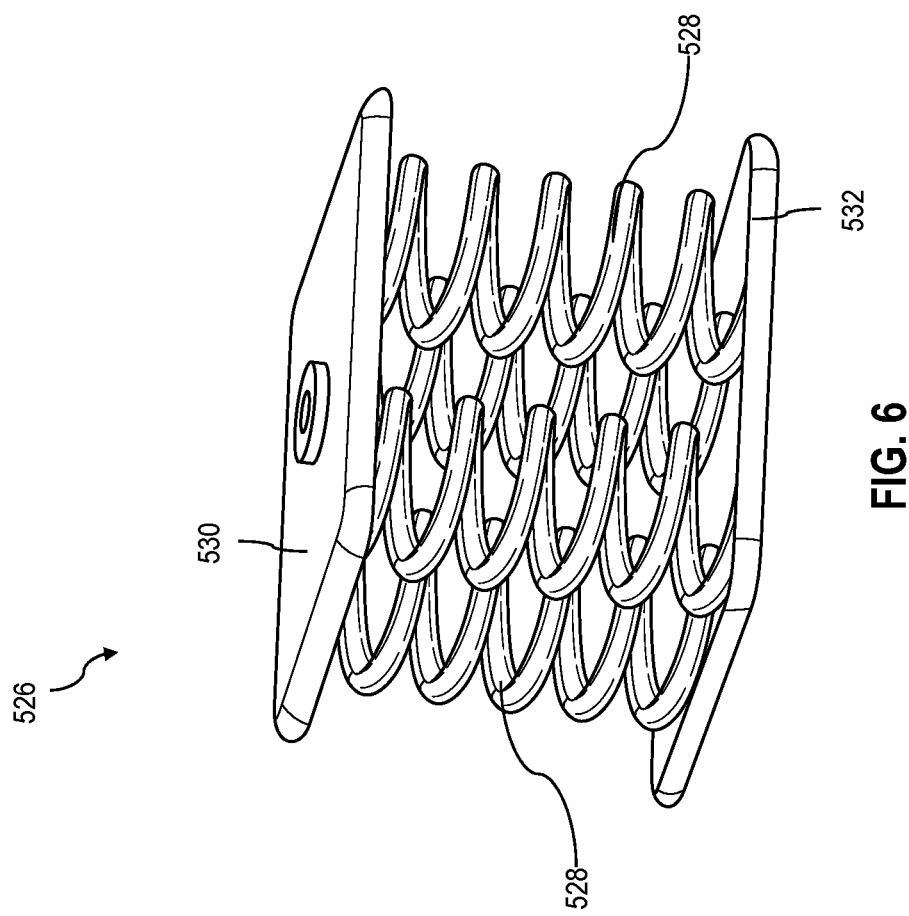
FIG. 6 illustrates a support of the baggage bar assembly of FIG. 5 according to embodiments of the present invention.
Figure 5:
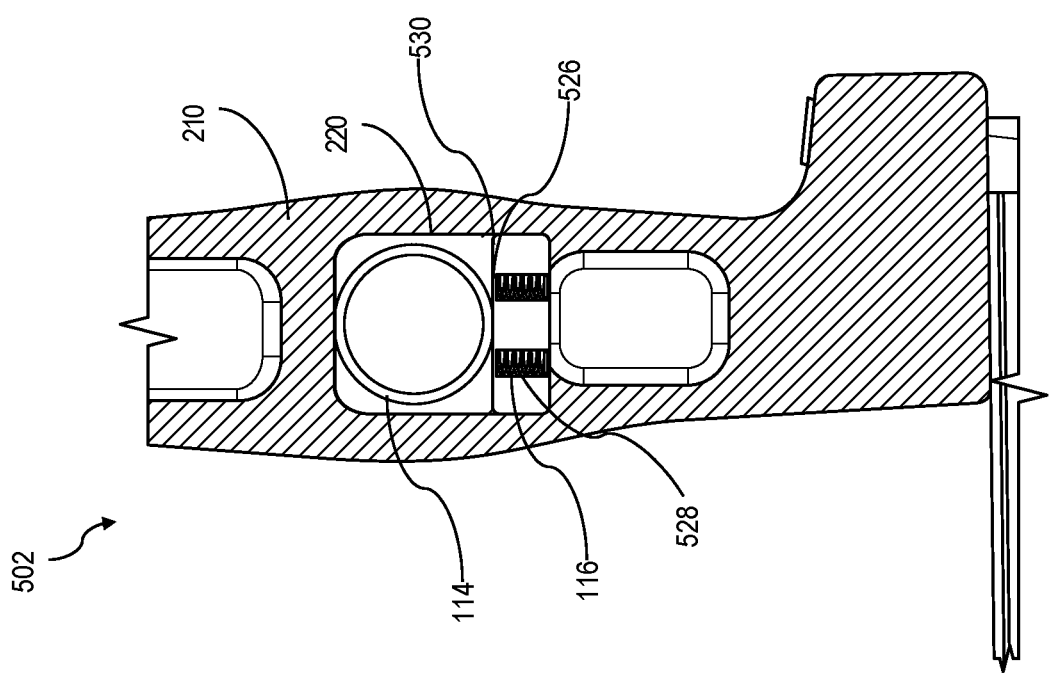
FIG. 5 is a sectional view of a portion of a leg of a passenger seat and a baggage bar assembly according to embodiments of the invention.

FIGS. 5 and 6 illustrate another example of a baggage bar assembly 502 with the leg 210 according to embodiments. The baggage bar assembly 502 is substantially similar to the baggage bar assemblies 102, 202 and includes the baggage bar 114 and the support 116. Compared to the baggage bar assemblies 102, 202, the support 116 of the baggage bar assembly 502 is a spring mechanism 526. As best illustrated in FIG. 6, the spring mechanism 526 includes one or more springs 528 retained between a pair of plates 530, 532; however, the spring mechanism 526 illustrated should not be considered limiting, and in other embodiments the spring mechanism 526 may have other components, features, constructions, etc. as desired.

As best illustrated in FIG. 5, the spring mechanism 526 is provided within the aperture 220 between a portion of the baggage bar 114 and the leg 210. The spring mechanism 526 as the support 116 allows for movement of the baggage bar 114 relative to the leg 210, thereby absorbing energy or loads applied on the baggage bar 114 in at least one direction. The spring mechanism 526 as the support 116 decreases stiffness of the baggage bar assembly 502, which may allow for the baggage bar 114 to have a reduced thickness, thereby providing weight and cost savings.

Figure 7:
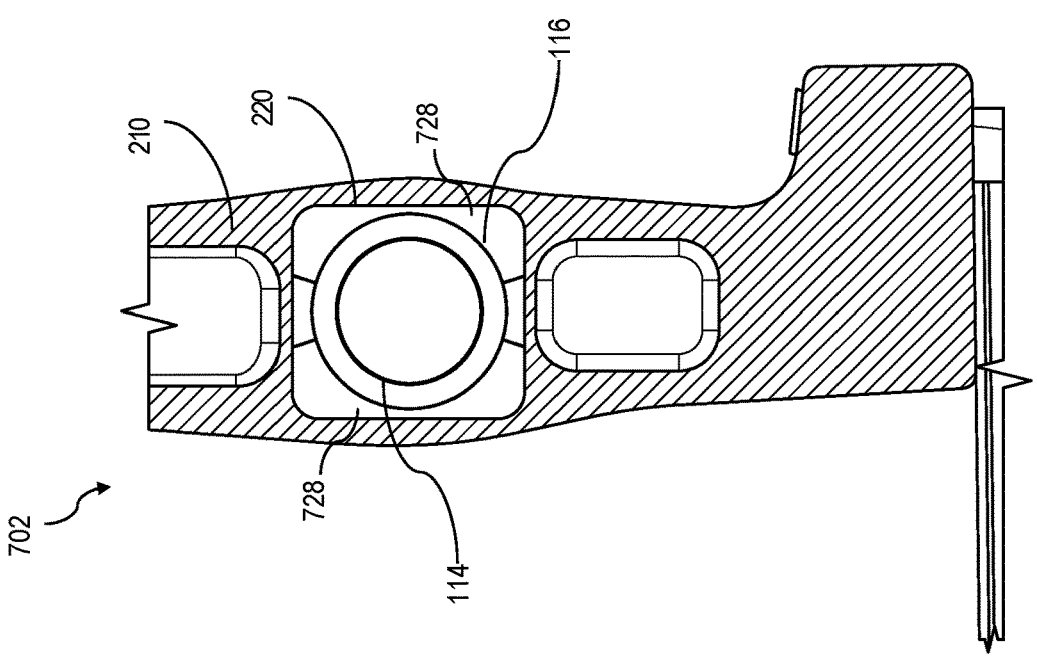
FIG. 7 is a sectional view of a portion of a leg of a passenger seat and a baggage bar assembly according to embodiments of the invention.

FIG. 7 illustrates another example of a baggage bar assembly 702 with the leg 210 according to embodiments. The baggage bar assembly 702 is substantially similar to the baggage bar assemblies 102, 202, 502 and includes the baggage bar 114 and the support 116. Compared to the baggage bar assemblies 102, 202, 502, the baggage bar assembly 702 includes a plurality of damping vibration isolators 728. In FIG. 7, the baggage bar assembly 702 includes two damping vibration isolators 728; however, in other embodiments, any number of damping vibration isolators 728 may be utilized. In various embodiments, the damping vibration isolators 728 may be constructed from a material similar to that of the energy absorber 222, such as but not limited to rubber (natural or synthetic), neoprene, silicone, foams, other elastomeric materials, combinations thereof, and/or other energy absorbing materials as desired. Compared to the energy absorber 222, the damping vibration isolators 728 do not completely surround the baggage bar 114 within the aperture 220. Stated differently, the damping vibration isolators 728 are provided between portions of the baggage bar 114 and the leg 210 when the baggage bar assembly 702 is assembled. The damping vibration isolators 728 as the support 116 may allow for movement of the baggage bar 114 relative to the leg 210 and may absorb energy in various directions as desired, including all directions. The damping vibration isolators 728 as the support 116 decreases stiffness of the baggage bar assembly 702, which may allow for the baggage bar 114 to have a reduced thickness, thereby providing weight and cost savings.

Figure 9:
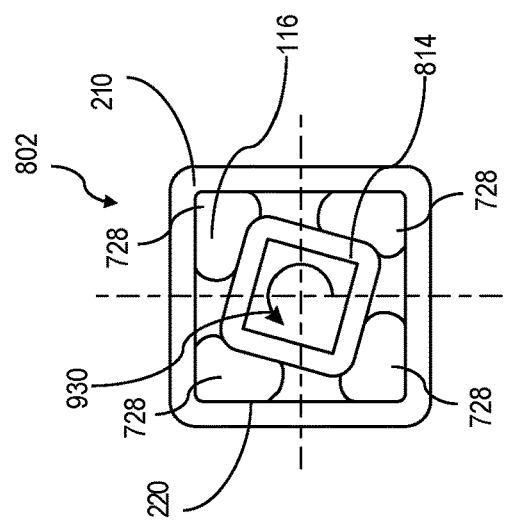
FIG. 9 is another sectional view of the baggage bar assembly of FIG. 8 illustrating movement of the baggage bar.
Figure 8:
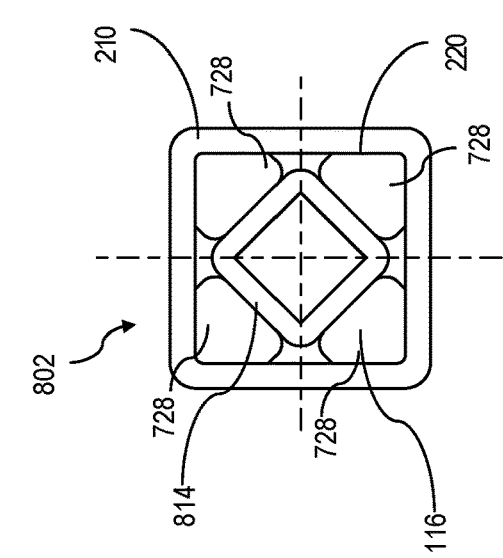
FIG. 8 is a sectional view of a baggage bar assembly according to embodiments.

FIGS. 8 and 9 illustrate a baggage bar assembly 802 that is substantially similar to the baggage bar assembly 702 except that the baggage bar assembly 802 includes four damping vibration isolators 728 as the support 116 and includes a baggage bar 814 with a square profile. As represented by the arrow 930 in FIG. 9, the baggage bar assembly 802 allows for rotational movement of the baggage bar 814 relative to the leg 210, thereby absorbing energy and loads applied on the baggage bar 814. It is noted that other embodiments of the support 116 described herein may allow for rotational, linear, and/or other movement as desired to absorb energy and loads and/or to decrease stiffness of the baggage bar assembly.

Figure 10:
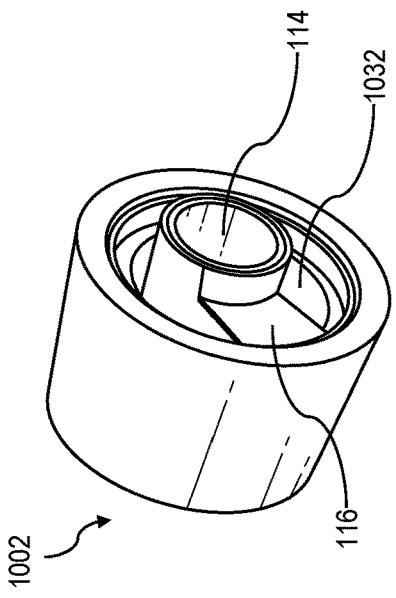
FIG. 10 illustrates a baggage bar assembly according to embodiments.

FIG. 10 illustrates a baggage bar assembly 1002 that is substantially similar to the baggage bar assemblies 102, 202, 502, 702, 802 and includes the baggage bar 114 and the support 116. Compared to the other baggage bar assemblies, the support 116 of the baggage bar assembly 1002 is a bearing mechanism 1032. The bearing mechanism 1032 may be various types of bearings as desired. In one non-limiting examples, the bearing mechanism 1032 is a ball bearing. The bearing mechanism 1032 may define an aperture that receives a portion of the baggage bar 114 such that the baggage bar 114 extends through the bearing mechanism 1032. When the baggage bar assembly 1002 is assembled with a passenger seat, the bearing mechanism 1032 may be provided within an aperture (such as the aperture 220 of the leg 210). The bearing mechanism 1032 as the support 116 allows for rotational movement of the baggage bar 114, and the bearing mechanism 1032 absorbs energy or loads applied on the baggage bar 114. The bearing mechanism 1032 as the support 116 may also decrease stiffness of the baggage bar assembly 1002, which may allow for the baggage bar 114 to have a reduced thickness, thereby providing weight and cost savings.

Figure 11:
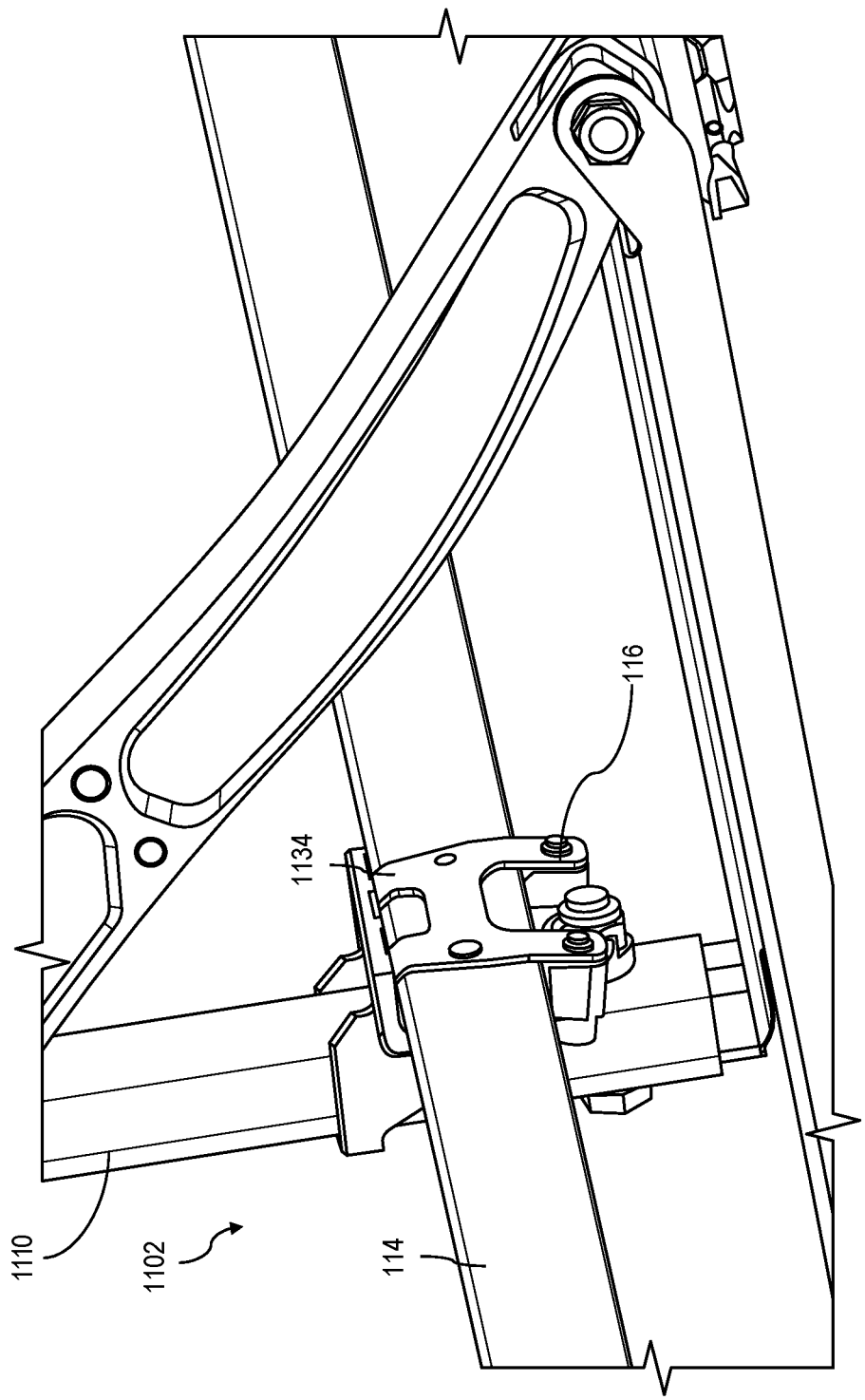
FIG. 11 illustrates of a portion of a leg of a passenger seat and a baggage bar assembly according to embodiments of the invention.

FIG. 11 illustrates a baggage bar assembly 1102 on a leg 1110 of a passenger seat assembly according to embodiments. The baggage bar assembly 1102 is substantially similar to the baggage bar assemblies 102, 202, 502, 702, 802, 1002 and includes the baggage bar 114 and the support 116. Compared to the other baggage bar assemblies 102, 202, 502, 702, 802, 1002, the support 116 of the baggage bar assembly 1102 is not positioned within an aperture defined on the leg 1110 or other frame component; instead, the support 116 of the baggage bar assembly 1102 supports the baggage bar 114 offset from the leg 1110. In the embodiment illustrated, the support 116 is a bracket 1134 that is rotatably or hingedly mounted on the leg 1110 using various mechanisms or features as desired such that the bracket 1134 connects the baggage bar 114 to the leg 1110 while allowing for movement of the baggage bar 114. The bracket 1134 should not be considered limiting on the disclosure, and in other embodiments, other types of brackets may support the baggage bar 114 relative to the passenger seat assembly, and/or other types of supports 116 may connect the baggage bar 114 to the passenger seat assembly at various locations as desired on, within, or through components of the passenger seat assembly.

A collection of exemplary embodiments is provided below, including at least some explicitly enumerated as "Illustrations" providing additional description of a variety of example embodiments in accordance with the concepts described herein. These illustrations are not meant to be mutually exclusive, exhaustive, or restrictive; and the disclosure not limited to these example illustrations but rather encompasses all possible modifications and variations within the scope of the issued claims and their equivalents.

Illustration 1. A baggage bar assembly for a passenger seat, the baggage bar assembly comprising: a baggage bar; and a support for supporting the baggage bar while allowing for movement of the baggage bar relative to the passenger seat.

Illustration 2. The baggage bar assembly of any of the preceding or subsequent illustrations, wherein the support comprises an energy absorber positionable within an aperture defined by the passenger seat.

Illustration 3. The baggage bar assembly of any of the preceding or subsequent illustrations, wherein the energy absorber defines a central aperture, and wherein the baggage bar extends through the central aperture of the energy absorber.

Illustration 4. The baggage bar assembly of any of the preceding or subsequent illustrations, wherein a cross-section of the central aperture is different from a cross-section of the baggage bar.

Illustration 5. The baggage bar assembly of any of the preceding or subsequent illustrations, wherein the support comprises an elastomer shock absorber.

Illustration 6. The baggage bar assembly of any of the preceding or subsequent illustrations, wherein the support comprises a spring mechanism positionable within an aperture defined by the passenger seat.

Illustration 7. The baggage bar assembly of any of the preceding or subsequent illustrations, wherein the support comprises a bearing mechanism.

Illustration 8. The baggage bar assembly of any of the preceding or subsequent illustrations, wherein the support is attachable to a frame component of the passenger seat or be positionable within an aperture defined by the frame component.

Illustration 9. The baggage bar assembly of any of the preceding or subsequent illustrations, wherein the support allows for at least one of rotational movement or linear movement of the baggage bar.

Illustration 10. The baggage bar assembly of any of the preceding or subsequent illustrations, wherein the support allows for both rotational movement and linear movement of the baggage bar.

Illustration 11. A passenger seat comprising: a frame component; and the baggage bar assembly of any of the preceding or subsequent illustrations, wherein the support allows for movement of the baggage bar relative to the frame component.

Illustration 12. The passenger seat of any of the preceding or subsequent illustrations, wherein the frame component comprises a seat leg of the passenger seat.

Illustration 13. The passenger seat of any of the preceding or subsequent illustrations, wherein the frame component defines an aperture, wherein the baggage bar extends through the aperture, and wherein the support is provided within the aperture between at least a portion of the baggage bar and the frame component.

Illustration 14. The passenger seat of any of the preceding or subsequent illustrations, wherein a cross-section of the aperture is different from a cross-section of the baggage bar.

Illustration 15. The passenger seat of any of the preceding or subsequent illustrations, wherein the support comprises a bearing mechanism within the aperture.

Illustration 16. A passenger seat comprising a frame component and a baggage bar that is movable relative to the frame component.

Illustration 17. The passenger seat of any of the preceding or subsequent illustrations, further comprising at least one of an elastomer shock absorber, a spring mechanism, or a bearing mechanism supporting the baggage bar relative to the frame component.

Illustration 18. A baggage bar assembly for a passenger seat, the baggage bar assembly comprising: a baggage bar; and a bearing mechanism configured to support the baggage bar on a portion of the passenger seat, wherein the baggage bar is movable via the bearing mechanism.

Illustration 19. The baggage bar assembly of any of the preceding or subsequent illustrations, wherein the bearing mechanism comprises ball bearings and defines a circular aperture for receiving the baggage bar.

Illustration 20. A passenger seat comprising the baggage bar of any of the preceding or subsequent illustrations and a leg assembly for the passenger seat, wherein the leg assembly is the portion of the passenger seat supporting the bearing mechanism.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:

1. A baggage bar assembly for a passenger seat, the baggage bar assembly comprising:
   a baggage bar extending across a plurality of seat legs of the passenger seat; and
   a plurality of supports for supporting the baggage bar while allowing for movement of the baggage bar relative to at least a portion of the plurality of supports, wherein each support of the plurality of supports is positioned within a corresponding seat leg of the plurality of seat legs, and wherein each support of the plurality of supports surrounds a different portion of the baggage bar.

2. The baggage bar assembly of claim 1, wherein the plurality of supports comprises an energy absorber positionable within an aperture defined by the passenger seat.

3. The baggage bar assembly of claim 2, wherein the energy absorber defines a central aperture, and wherein the baggage bar extends through the central aperture of the energy absorber.

4. The baggage bar assembly of claim 3, wherein a cross-section of the central aperture is different from a cross-section of the baggage bar.

5. The baggage bar assembly of claim 1, wherein the plurality of supports comprise an elastomer shock absorber.

6. The baggage bar assembly of claim 1, wherein the plurality of supports allow for at least one of rotational movement or linear movement of the baggage bar.

7. The baggage bar assembly of claim 6, wherein the plurality of supports allow for both rotational movement and linear movement of the baggage bar.

8. A passenger seat comprising:
   a frame component; and
   the baggage bar assembly of claim 1, wherein the plurality of supports allow for movement of the baggage bar relative to the frame component.

9. The passenger seat of claim 8, wherein the frame component comprises the plurality of seat legs.

10. A passenger seat comprising:
    a frame component that comprises a plurality of seat legs;
    a baggage bar that is movable relative to the frame component; and
    a plurality of supports for supporting the baggage bar while allowing for movement of the baggage bar relative to at least a portion of the plurality of supports, wherein each support of the plurality of supports is positioned within a corresponding seat leg of the plurality of seat legs, and wherein each support of the plurality of supports surrounds a different portion of the baggage bar.

11. The passenger seat of claim 10, further comprising at least one of an elastomer shock absorber, a spring mechanism, or a bearing mechanism supporting the baggage bar relative to the frame component.

\* \* \* \* \*